United States Patent [19]
Day

[11] Patent Number: 5,632,095
[45] Date of Patent: May 27, 1997

[54] INCREMENTAL MARKED FRAMING LUMBER PRODUCT AND METHOD

[76] Inventor: James E. Day, 572 Main St., Metuchen, N.J. 08840

[21] Appl. No.: 447,436

[22] Filed: May 23, 1995

[51] Int. Cl.$^6$ ............................................. B43L 7/00
[52] U.S. Cl. .................... 33/494; 33/483; 33/492
[58] Field of Search .......................... 33/1 G, 1 F, 758, 33/759, 760, 483, 484, 485, 486, 487, 492, 493, 494, 404, 407; 52/730.7, 731.1, 731.9, 731.5

[56] References Cited

U.S. PATENT DOCUMENTS

| | | | |
|---|---|---|---|
| 1,607,097 | 11/1926 | Murphy | 33/485 |
| 2,187,087 | 1/1940 | Leary | 33/758 |
| 2,449,265 | 9/1948 | Williams . | |
| 3,797,120 | 3/1974 | Byne . | |
| 3,934,352 | 1/1976 | Quenot | 33/493 |
| 3,936,944 | 2/1976 | Byne . | |
| 4,149,320 | 4/1979 | Troyer et al. | 33/758 |
| 4,301,596 | 11/1981 | Sedlock | 33/494 |
| 4,527,337 | 7/1985 | Dreiling | 33/613 |
| 4,708,755 | 11/1987 | Lambelet | 33/758 |
| 4,942,670 | 7/1990 | Brandt . | |
| 5,012,590 | 5/1991 | Wagner et al. . | |
| 5,038,492 | 8/1991 | Bryant et al. | 33/758 |
| 5,195,249 | 3/1993 | Jackson | 33/1 G |
| 5,335,421 | 8/1994 | Jones, Jr. | 33/494 |

FOREIGN PATENT DOCUMENTS

| | | | |
|---|---|---|---|
| 57-100302 | 6/1982 | Japan | 33/485 |
| 7708498 | 2/1979 | Netherlands | 33/493 |
| 1226055 | 3/1971 | United Kingdom | 33/758 |

OTHER PUBLICATIONS

*Tooling and Production*, "Pre–Printed Adhesive Tape . . ." Dec. 1952.

*Primary Examiner*—G. Bradley Bennett
*Attorney, Agent, or Firm*—Richard P. Crowley

[57] ABSTRACT

A lumber product for use in the cutting and assembling of lumber for the framing of a building, having a first and second end, and a face and back surface and opposite edges; and a plurality of visible marking lines stamped or imprinted on at least one surface of the lumber piece, extending generally the length of the lumber, and placed at selected intervals for framework measuring, cutting or assembly.

13 Claims, 2 Drawing Sheets

INCREMENTAL MARKED FRAMING LUMBER PRODUCT AND METHOD

BACKGROUND OF THE INVENTION

There are many known devices for measuring lumber for use by carpenters, and more especially framing carpenters, to measure, cut and assemble lumber for the frame of a house or other structure. The most commonly used devices are tape measures, rulers and carpenter's squares. These devices enable a carpenter who desires to cut a piece of framing lumber to accurately measure and draw straight lines on the framing lumber for cutting and assembling. Using these devices involves several steps, including the additional necessity of a pencil or other marking tool, placing the measuring device on the lumber, holding it stable, and making a mark for cutting or assembly. Very often, this step has to be repeated in an identical manner on several pieces of lumber as required in a typical framing project. These steps, when factored in with other variables, such as the skill level of a professional framing carpenter who desires speed in execution, or an unskilled carpenter who lacks experience in making such measurements, are time consuming and can contribute to costly errors in framing.

It is desirable to provide a new and improved lumber product and method, including visible incremental marking lines printed or stamped thereon, which overcomes some of the disadvantages of the prior art and improves the speed and accuracy of the measuring, cutting and framing process for carpenters.

SUMMARY OF THE INVENTION

The present invention concerns a lumber product, adapted for use in the measuring, cutting and assembling of lumber for the framing of a house or other structure.

The lumber product comprises a piece of lumber used for the framing of a structure which has a first and second end, a face and back surface and opposite edges, and has a plurality of visible markings imprinted or stamped or otherwise secured on at least one surface for measuring purposes. The lumber used is standard in the industry for framing, and may comprise a lumber piece known as a stud, which may be a 2×2, 2×3, 2×4, 2×6, 2×8, 2×10, or 2×12 framing stud of varying lengths, a 4×8 or 4×12 laminated framing lumber piece, such as plywood, of varying thickness, and may also be a 4×4 framing lumber piece of varying lengths.

The lumber product has visible marking lines spaced at ½" intervals in a parallel manner and which lines extend substantially across the entire length of the lumber piece. At preselected intervals, such as 12 inches, 16 inches, and 24 inches or combinations thereof, additional visible marking lines are imprinted or stamped on the lumber piece. These visible marking lines may be of different colors or designs, or combinations thereof, to distinguish one selected marking from another, to enable the carpenter to see quickly and easily the measurements to be marked. While the embodiment described herein uses the English measurement system, it is acknowledged that other measurement systems may be used as necessary and desired. The visible marking lines extend substantially toward the center of the face surface of the lumber piece, and may also extend downwardly along the one or both edges of the lumber piece and represent a peripheral marking line for stud lumber, to further enhance identification for measuring. Visible marking lines may also be printed on the back surface of the lumber piece as desired.

The parallel visible marking lines on the face surface of the lumber piece are separated down the middle longitudinally by an unmarked section. This division provides for the separation of two identical sets of visible markings, comprised of lines and numerals defining the lines, which are at opposing ends of the face surface. These identical sets of markings are placed near the outer edge of the lumber piece and begin at the first, or left end, of the lumber piece as it faces the carpenter, with the number "1" at the 1 inch mark, and with consecutive numbers appearing at each 1 inch interval. Adjacent to the center of the face surface, above these consecutive numbers, additional consecutive numbers ranging from 1–11 will appear at each one-inch interval. In this numerical sequence, the number "12" does not appear as the 12 inch mark; rather, each 12 inch unit, or foot, is marked "1" for 12 inches, "2" for 24 inches and so on. The number "12" would only appear as an identifier of the twelfth foot. Each line that represents a multiple of 16 inches and 24 inches will be further differentiated by color and design and will also extend downwardly on each edge. The laminated plywood piece has similar visible markings lines on all four edges of the face surface.

The numbers and visible marking lines may be differentiated by a contrasting color or design or any combination thereof; including broken or dotted lines, geometric forms, and various color combinations that will enable the carpenter to easily distinguish the measurement units. In another embodiment, the visible marking lines may extend substantially across the entire width of the lumber piece, without an unmarked separating space.

Thus, the carpenter can determine at a glance the measurement that has to be taken both in inches, from the numbers adjacent the edges, and from the foot/inch indicators located directly above those numbers. The visible marking lines on the lumber piece eliminates the need for additional tools and implements, saves time and improves accuracy in measuring for framing purposes, where exact measurements are critical to the framing of the structure and repeated identical measurements are needed.

The invention will be described for the purposes of illustration only in connection with certain embodiments; however, it is recognized that those persons skilled in the art may make various modifications, changes, improvements and additions to the preferred or illustrated embodiments, all without departing from the spirit and scope of the invention.

DETAILED DESCRIPTION OF THE INVENTION

Figure 1:
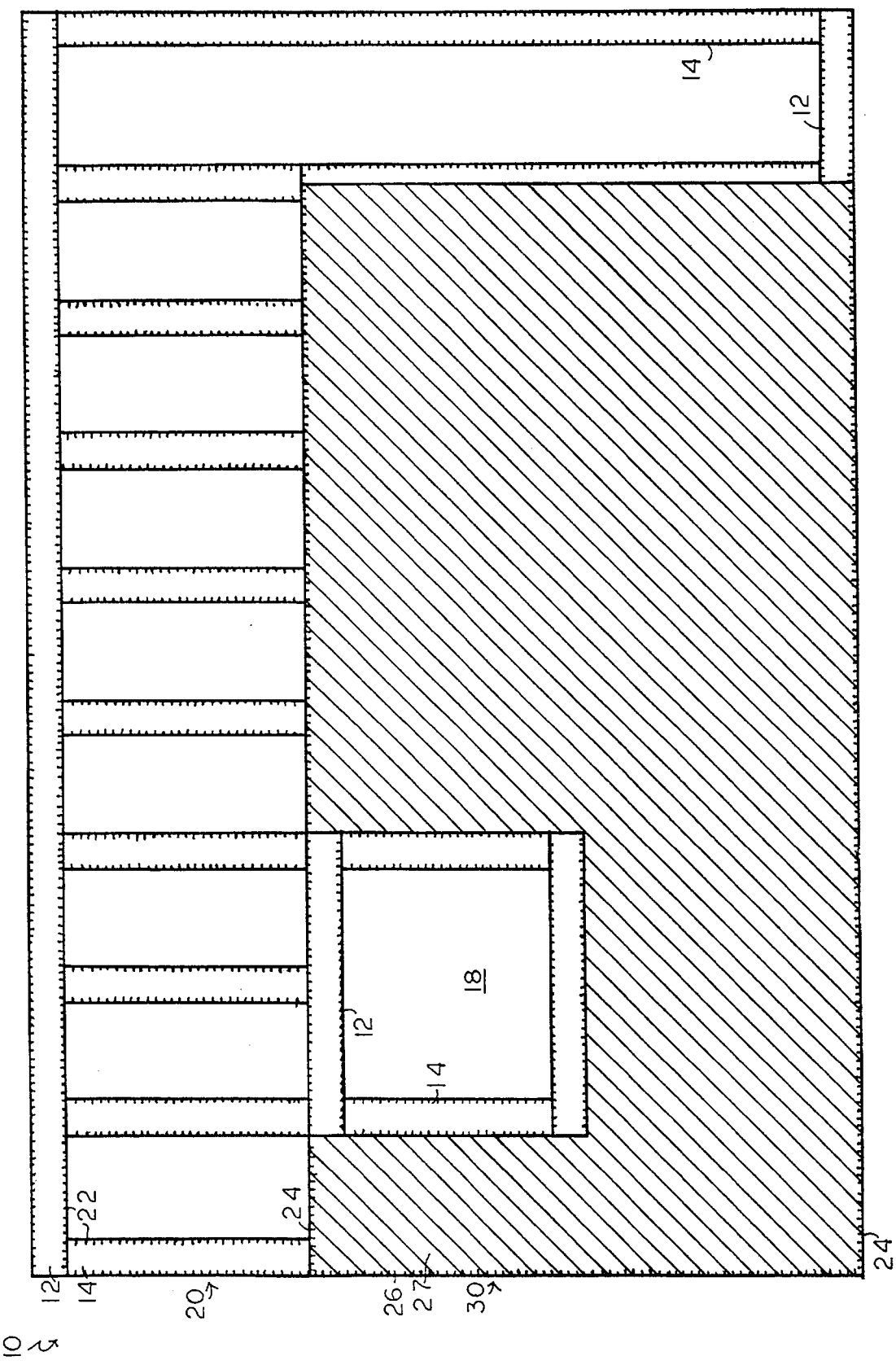
FIG. 1 is an elevational view of a portion of a framing system for a wall.

In the drawings, FIG. 1 shows a portion of a framed structure 10, such as the wall of a house, with horizontal 12 and vertical 14 framing lumber pieces, commonly known as footer/header and studs respectively, measured and cut according to visible marking lines 22. A 4×8 plywood laminate framing lumber piece 30, is also shown with visible marking lines 24 and 26 imprinted or stamped along all four edges on the face surface 27. FIG. 1 also shows a window opening 18 created by simply cutting the marked lumber pieces 12, 14, and 30.

Figure 2:
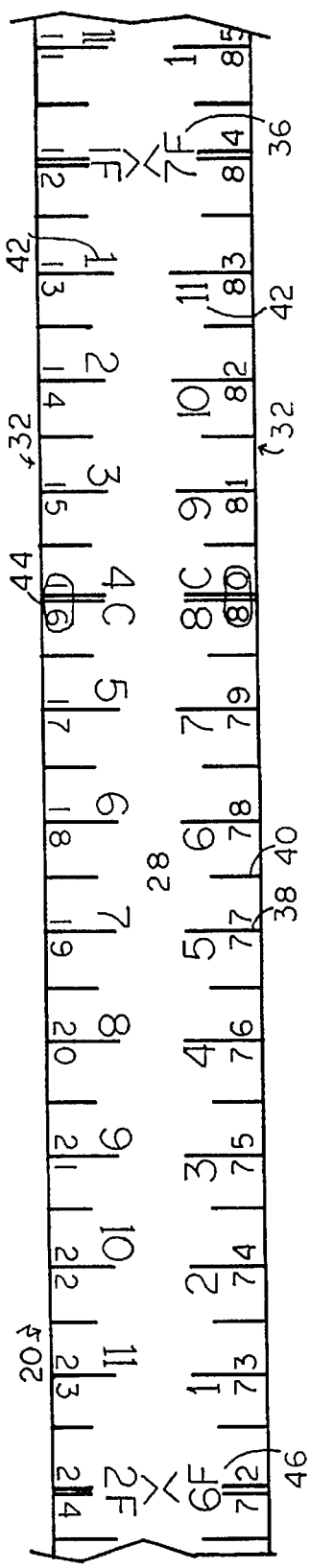
FIG. 2 is a cutaway, enlarged, top plan view of the lumber piece of the invention.

FIG. 2 shows an enlarged, cutaway top plan view of the lumber piece 20 with visible marking lines imprinted thereon. The top surface 28 is marked with inch indicators 38, half-inch indicators 40, foot/inch indicators 42, foot indicators 36, 16 inch spacer indicators 44 and 24 inch spacer indicators 46. In this embodiment, foot indicators 36 are shown within an inverted "V" shape, and 16 inch indicators 44 are shown within circles. Further, the 16 inch spacer indicators 44, are shown on the side 34 with a large letter "C" on the edges and in a double line design. It should be noted that the 16 inch and 24 inch increments are the industry standard for spacing framing studs, depending on the climate of the building area.

Figure 3:
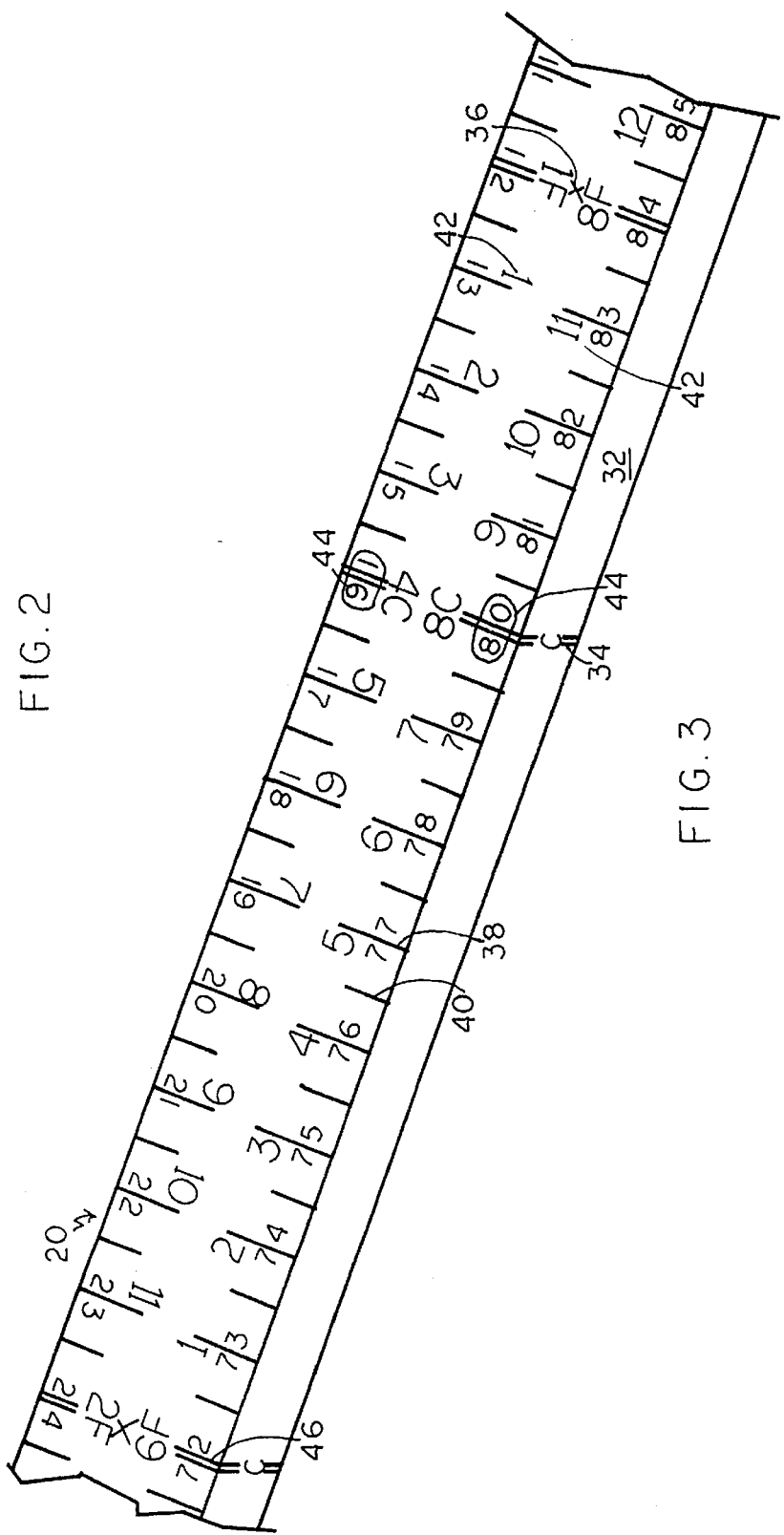
FIG. 3 is a perspective view from above of the invention of FIG. 2.

FIG. 3 shows the lumber piece of the invention 20 in perspective from above, with the edges 32 also having visible marking lines extending downwardly thereon for the 16 inch spacer indicators 44 and 24 inch spacer indicators 46. This additional marking enhances the carpenter's ability to assemble or cut the lumber piece quickly and easily.

In use, a carpenter, after determining the required measurements of the framework being constructed, may take one or more pieces of the marked lumber and cut and/or assemble them easily, accurately and quickly to construct the framework. This procedure can be accomplished without having to carry additional tools that may be cumbersome and time consuming to transport. Further, the invention enables the professional framer to identify quickly and easily where cuts have to be made and assembly take place. The invention also facilitates accuracy and ease of use for the non-professional carpenter, who is not experienced in combining measurement tools with lumber and is more likely to make errors when conducting repetitive measurements. In both cases the invention will aid in the accuracy of measurement, cutting and framing, which are critical in any framing project, saving the time and expense of errors.

What is claimed is:

1. A framing lumber product, adapted for use in the cutting and assembling of lumber for constructing a building, which lumber product comprises:
    a) a piece of lumber of a selected length for use in the construction of a building, the piece of lumber having a first and second end, and a face and back surface and opposite sides;
    b) a plurality of visible marking lines and corresponding numerals formed directly on at least one surface of said lumber, and at least a plurality of said lines extending generally substantially across the face or back surface and placed at preselected framing, cutting or assembly intervals in a parallel manner and perpendicular to the length of said lumber and extending each to the sides and spaced apart along the length of said lumber;
    c) wherein a plurality of selected visible marking lines and numerals extend across a face or back surface and down at least one side of said piece of lumber; and
    d) wherein a plurality of the selected marking lines and corresponding numerals include at least two different colors or designs.

2. The product of claim 1 wherein said visible marking lines and corresponding numerals may be any combination of differing colors and designs.

3. The product of claim 1 wherein said intervals are ½", 1", 12", 16" and 24" intervals or combinations thereof.

4. The product of claim 1 where said visible marking lines are printed or stamped on to said lumber surface.

5. The product of claim 1 wherein said lumber piece comprises a 2×2, 2×3, 2×4, 2×6, 2×8, 2×10, 2×12, or 4×4 piece of framing lumber or combinations thereof.

6. The product of claim 1 wherein said lumber piece comprises a 4×8 or 4×12 piece of laminated plywood lumber or combinations thereof.

7. The product of claim 1 wherein said visible marking lines comprise two identical sets of marking lines positioned adjacent each edge, and wherein one set begins at said first end and the other set begins at said second end.

8. The visible marking lines of claim 7 wherein said lines are separated by an unmarked space longitudinally positioned in the center and along the length of said lumber piece.

9. The product of claim 1 wherein a plurality of said selected visible marking lines extend continuously around both sides of said lumber.

10. The product of claim 1 wherein one or more of said visible marking lines extend around the total periphery of said lumber.

11. In combination, the product of claim 1 in use in the construction of a frame for a structure.

12. A lumber product, adapted for use in the cutting and assembling of lumber for the construction of a building, which lumber product comprises:
    a) a piece of lumber of selected length for use as a framing material in the framing of a building, said lumber piece having a first and second end, and a face and back surface and opposite edges and sides;
    b) a plurality of visible marking lines and corresponding numerals of differing colors and designs directly imprinted on the face surface of said lumber, said lines extending generally perpendicularly substantially across the length and, with corresponding numerals, placed at preselected framing, cutting or assembly intervals in a parallel manner along the length of said lumber, with two identical sets of visible marking lines positioned adjacent each face or back surface and side, and wherein one set begins at said first end and the other set begins at said second end, and wherein the lines are separated by an unmarked space longitudinally positioned in the center along the length of said lumber piece; and
    c) one or more selected visible marking lines being extended down the opposite edges and sides of said lumber piece.

13. The product of claim 12 wherein the visible marking lines and corresponding numerals are imprinted both on the front and back surface.

* * * * *